United States Patent [19]

Torii et al.

[11] Patent Number: 5,296,671
[45] Date of Patent: Mar. 22, 1994

[54] PIPING ARRANGEMENT FOR A LASER ROBOT WRIST

[75] Inventors: Nobutoshi Torii, Tokyo; Akihiro Terada; Yasuo Sasaki, both of Minamitsuru, all of Japan

[73] Assignee: Fanuc Ltd., Yamanashi, Japan

[21] Appl. No.: 930,525

[22] PCT Filed: Jan. 30, 1992

[86] PCT No.: PCT/JP92/00093
§ 371 Date: Sep. 30, 1992
§ 102(e) Date: Sep. 30, 1992

[87] PCT Pub. No.: WO92/13669
PCT Pub. Date: Aug. 20, 1992

[30] Foreign Application Priority Data

Jan. 30, 1991 [JP] Japan .................................. 3-9716

[51] Int. Cl.⁵ .................................. B23K 26/08
[52] U.S. Cl. ............................ 219/121.78; 219/121.84
[58] Field of Search ............ 219/121.78, 121.84, 219/121.79, 121.74

[56] References Cited

U.S. PATENT DOCUMENTS

| 4,661,681 | 4/1987 | Bannister | 219/121.78 |
| 4,695,701 | 9/1987 | Monteith et al. | 219/121.79 |
| 5,208,439 | 5/1993 | Arai | 219/121.74 |

FOREIGN PATENT DOCUMENTS 0206080 12/1986 European Pat. Off. .
0238307 9/1987 European Pat. Off. .
2-48295 4/1990 Japan .

OTHER PUBLICATIONS

Patent Abstracts of Japan, vol. 14, No. 450(M-1030), Sep. 27, 1990, & JP-A-21 79 380, Jul. 12, 1990.

Primary Examiner—C. L. Albritton
Attorney, Agent, or Firm—Nikaido, Marmelstein, Murray & Oram

[57] ABSTRACT

A piping arrangement in which a plurality of sealing means (70 through 78) are arranged on a sheathing pipe (42) provided as an outer pipe of a robot wrist (18) of a laser robot to thereby define annular chambers (84 through 90); the annular chamber (86 and 90) being used as a gas-carrying annular chamber for transferring an assist gas from one line to another, and a liquid-carrying chamber for transferring a liquid coolant from one line to another; the assist gas and the liquid coolant being supplied and returned through the gas-carrying annular chamber and the liquid-carrying annular chamber (84 and 90). Pipes (22, 24, 26, and 28) are arranged close to and along the outer surfaces of a robot forearm (16) and the robot wrist (18), and predetermined annular chambers (84, 88) other than the gas-carrying annular chamber (86) and the liquid-carrying annular chamber (90) being used as pressure chambers provided with sealing means (70 through 78) arranged thereamong, to thereby prevent leakage of the assist gas from the gas-carrying annular chamber and leakage of the liquid coolant from the liquid-carrying annular chamber.

8 Claims, 5 Drawing Sheets

PIPING ARRANGEMENT FOR A LASER ROBOT WRIST

TECHNICAL FIELD

The present invention relates to a piping arrangement for a laser robot wrist, and more particularly to a piping arrangement for the robot wrist of a laser robot in which pipe lines are arranged within and around the robot wrist to convey a liquid coolant for cooling laser beam reflecting mirrors disposed in the robot wrist of the laser robot, and to convey and supply an assist gas to a laser beam projecting device mounted on the robot wrist in such a compact manner that interference between the pipe lines and peripheral equipment is avoided, and that a reliable prevention of pipe line damage and liquid coolant leakage can be ensured.

BACKGROUND ART

Referring to FIGS. 5A and 5B, a laser robot in general using a high-energy laser beam requires flexible pipes 7a for conveying a liquid coolant so as to cool reflecting mirrors 6 which are arranged to deflect the laser beam and a flexible pipe 7b for conveying an inert gas serving as an assist gas in laser machining. The flexible pipes 7a and 7b are arranged around a robot wrist 4 holding a laser beam projecting device 5 thereon These flexible pipes 7a and 7b are sufficiently slack so that the flexible pipes 7a and 7b are able to absorb the twisting and pulling that act thereon when the movable components of the laser robot, including the robot body, the robot upper arm, which are not shown, the robot forearm 3 and the robot wrist 4, operate according to their respective degree of freedom of movement.

However, problems arise when the flexible pipes 7a and 7b are arranged slackly around the robot wrist 4, namely, it is possible that the flexible pipes 7a and 7b will interfere with peripheral equipment or other equipment when the laser robot performs an operation including laser machining, and the flexible pipes may be damaged or broken by debris and welding spatters from the workpiece during a laser welding operation or laser cutting operation.

If the pipes are extended in a sheathing pipe of the robot wrist so as to improve the piping arrangement, the robot wrist must be provided with a sheathing pipe of increased diameter, which conflicts with functional requirements suggesting that a robot working end must be formed in the smallest and the lightest possible construction. Furthermore, when the pipes extend in the sheathing pipe of the robot wrist, the liquid coolant will flow into the mechanism of the robot wrist if the liquid coolant leaks from the pipes. Thus, using a sheathing pipe for protecting the flexible pipes is not yet practical.

DISCLOSURE OF THE INVENTION

Accordingly, a principal object of the present invention is to provide a piping arrangement for the robot wrist of a laser robot, thereby solving the problems resulting from slack flexible pipes arranged around the robot wrist, having a compact construction capable of arranging pipes for supplying an assist gas and a liquid coolant to a region between the robot wrist and the laser beam projecting device and returning the liquid coolant from the same region.

Another object of the present invention is to provide a piping arrangement for a laser robot wrist, capable of preventing the occurrence of problems owing to the leakage of the liquid coolant into the mechanism of the laser robot and the laser beam projecting device.

In light of the objects of the invention, the present invention employs a construction such that a plurality of annular chambers including annular liquid chambers for supplying and recovering a liquid coolant therethrough and annular gas chambers for supplying and recovering an assist gas therethrough are formed in the sheathing pipe of the robot wrist of a laser robot by using a plurality of sealing means, and fixedly arranges rigid metal pipes around and close to the robot forearm and the robot wrist. It is possible to use some of the annular chambers as pressure chambers for receiving compressed air through the inner pipe of the robot wrist to apply pressure to the sealing means so that the assist gas and the liquid coolant will not leak respectively from the annular gas chamber and the annular liquid chamber.

In accordance with one aspect of the present invention, there is provided a piping arrangement for a laser robot wrist for supplying working media, such as an assist gas and a liquid coolant, through a plurality of supply pipe means to the robot wrist joined for rotation at least about one axis to an extremity of a robot forearm of the laser robot and holding a laser beam projecting device, which comprises:

a sheathing pipe means serving as an outer pipe of the robot wrist;

a plurality of sealing means disposed on the sheathing pipe means of the robot wrist at appropriate spacings along the direction of an axis of rotary bearings supporting the robot wrist for rotation and provided in a joint joining the sheathing pipe means to an extremity of the robot forearm;

an annular sealing means holding ring mounted on the plurality of sealing means to hold the sealing means in place;

a plurality of annular chambers provided between the two neighbouring sealing means, and including at least one gas-carrying annular chamber and at least one liquid-carrying annular chamber;

first working medium supply pipe means connected to the gas-carrying annular chamber and the liquid-carrying annular chamber among the plurality of annular chambers and fixedly arranged along the outer surface of the robot forearm to convey a gaseous working medium and a liquid working medium; and second working medium supply pipe means arranged close to and along an outer surface of the sheathing pipe of the robot wrist to convey the assist gas and the liquid coolant through the gas-carrying annular chamber and the liquid-carrying annular chamber to a front portion of the robot wrist or to the laser beam projecting device.

In accordance with another aspect of the present invention, there is provided a piping arrangement for a laser robot wrist to supply working media such as an assist gas and a liquid coolant, through a plurality of supply pipe means to the robot wrist joined for rotation about at least one axis to an extremity of a robot forearm of the laser robot and holding a laser beam projecting device. The piping arrangement comprises:

a sheathing pipe means serving as an outer pipe of the robot wrist;

a plurality of sealing means disposed on the sheathing pipe of the robot wrist at appropriate spacings along the direction of an axis of a rotary bearing supporting the robot wrist for rotation and provided in a joint joining the sheathing pipe means to an extremity of the robot forearm;

a sealing means holding ring mounted on the plurality of sealing means to hold the sealing means in place;

a plurality of annular chambers formed between the two adjacent sealing means, and including at least one gas-carrying annular chamber and at least one liquid-carrying annular chamber;

first working medium supply pipe means connected to the gas-carrying annular chamber and the liquid-carrying annular chamber among the plurality of annular chambers and fixedly arranged along an outer surface of the robot forearm to convey a gaseous working medium and a liquid working medium;

second working medium supply pipe means arranged close to and along the outer surface of the sheathing pipe of the robot wrist to carry the assist gas and the liquid coolant through the gas-carrying annular chamber and the liquid-carrying annular chamber to a front portion of the robot wrist or to the laser beam projecting device; and compressed air passage means formed in an inner pipe extended within the sheathing pipe of the robot wrist to apply the pressure of compressed air through the inner pipe to the annular pressure chambers formed on the opposite sides of the gas-carrying annular chamber and on the opposite sides of the liquid-carrying annular chamber to prevent the leakage of the assist gas and the liquid coolant respectively from the gas-carrying annular chamber and the liquid-carrying annular chamber.

BRIEF DESCRIPTION OF THE DRAWINGS

The above and other objects, features and advantages of the present invention will become more apparent from the following description taken in conjunction with the accompanying drawings wherein.

BEST MODE OF CARRYING OUT THE INVENTION

Figure 4:
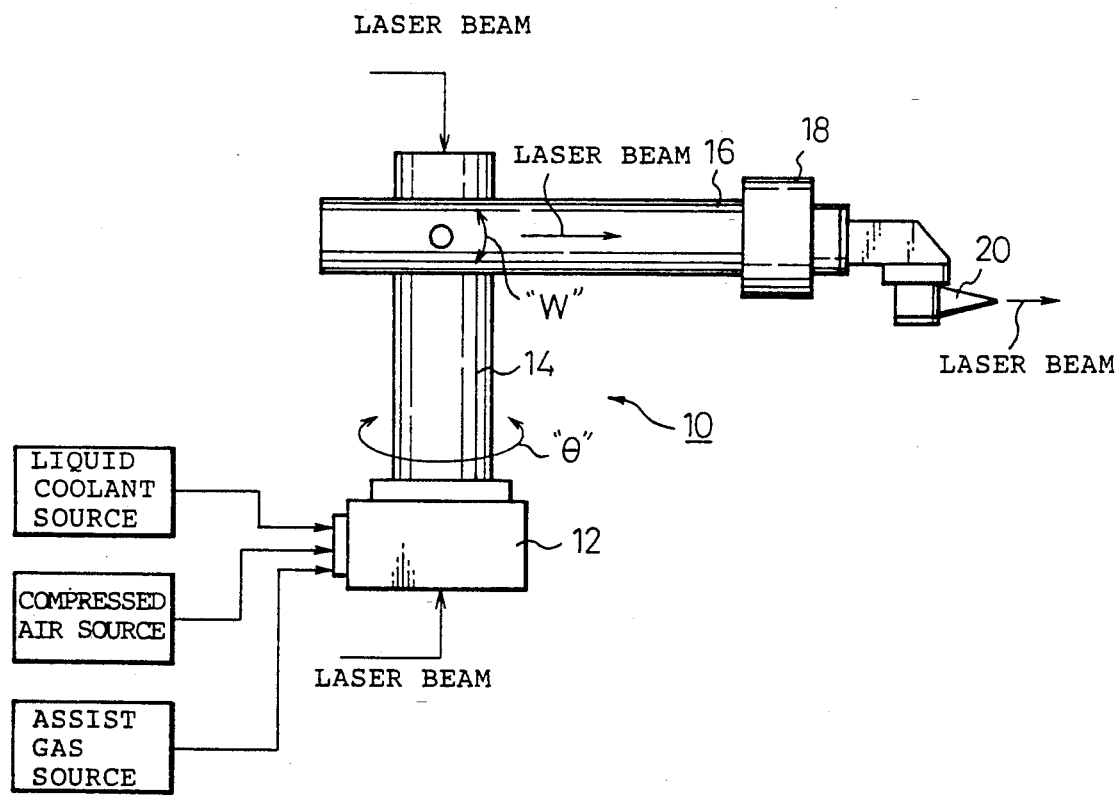
FIG. 4 is a side view illustrating a general construction of the laser robot.

Referring first to FIG. 4, a robot unit 10 of a laser robot is provided with, as principal components thereof, a robot base 12 fixedly installed on the floor of a workshop, a robot body 14 set upright for rotation about a vertical axis ($\theta$-axis) on the robot base 12, a robot arm 16 pivotally supported for a vertical swing motion about a horizontal axis (W-axis) on the side surface of the upper end of the robot body 14, a robot wrist 18 joined to an extremity of the robot arm 16 so as to turn about at least one axis, and a laser beam projecting device 20 attached to an extremity of the robot wrist 18.

A laser beam emitted by an external laser unit is transmitted through suitable laser beam conduits and guided into the robot unit 10 of the laser robot through the upper end of the robot body 14 or the bottom of the robot base 12. Then, the laser beam is reflected by reflecting mirrors, not shown, for deflecting the passage of the laser beam, provided respectively in a joint joining the robot body 14 and the robot arm 16, and the robot wrist 18 toward the laser beam projecting device 20.

A liquid coolant for cooling the reflecting mirrors, which is indispensable to the laser robot, and an inert gas for assisting laser machining (it is hereinafter referred to as "assist gas"), and compressed air for maintaining the interior of laser beam conduits extended within the robot unit 10 in a pressurized state to maintain the reflecting mirrors in a clean state and to prevent dust from entering the interior of the laser beam conduits supplied to the robot unit 10 respectively from their external sources disposed outside the robot unit 10 through supply lines connected to the robot base 12. The compressed air supplied to the robot unit 10 flows through the laser beam conduits and is discharged through the nozzle of the laser beam projecting device 20. The liquid coolant is supplied through liquid coolant supply lines extended within the robot unit 10 to the reflecting mirrors to cool the reflecting mirrors, and then the liquid coolant is returned through return lines to the external source. The supply and return lines come out of the robot arm 16 at suitable positions on the robot arm 16 and extend closely along the surface of the robot arm 16 to the robot wrist 18, which will be described later. The assist gas flows through the interior of the robot unit 10, comes out of the robot arm 16 at a suitable position on the robot arm 16, is conveyed by a pipe described later to the laser beam projecting device 20, and is spouted together with a laser beam against the working portion of a workpiece by the laser beam projecting device 20.

Figure 3:
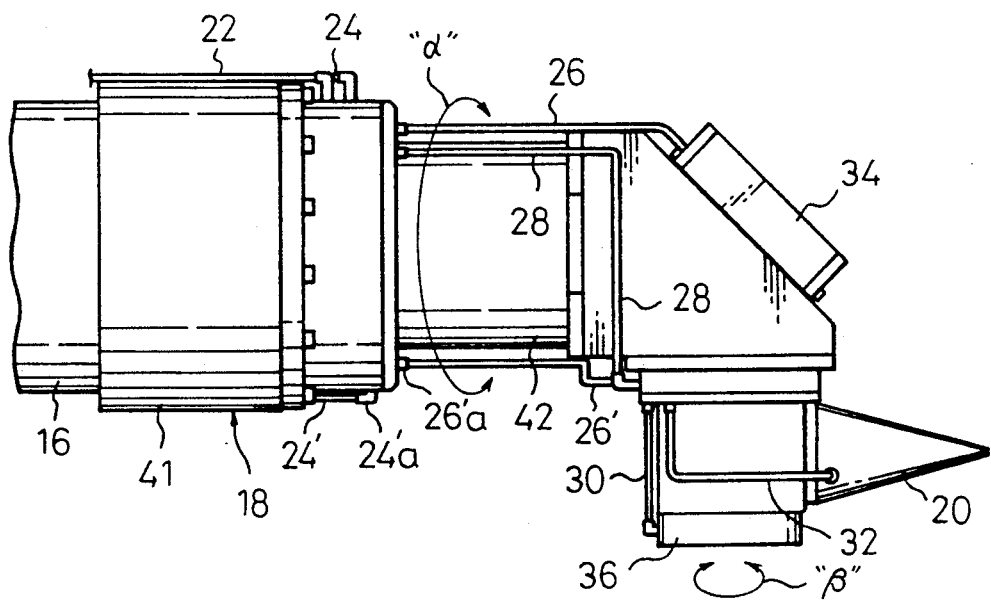
FIG. 3 is a fragmentary side view of the robot forearm and the robot wrist of a laser robot incorporating the piping arrangement of FIG. 1 therein.
Figure 5A:
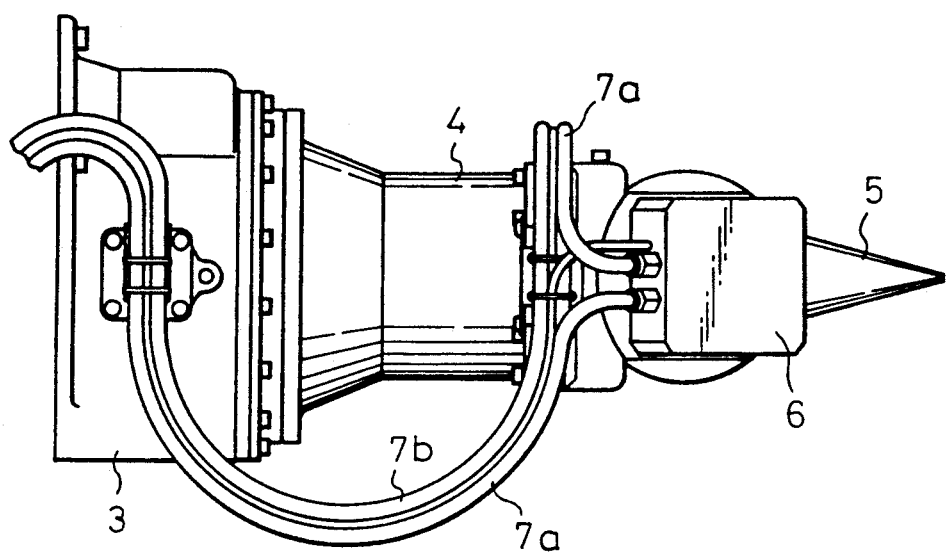
FIGS. 5A and 5B are a side view and a plan view, respectively, of a conventional piping arrangement on the robot wrist of a laser robot.
Figure 5B:
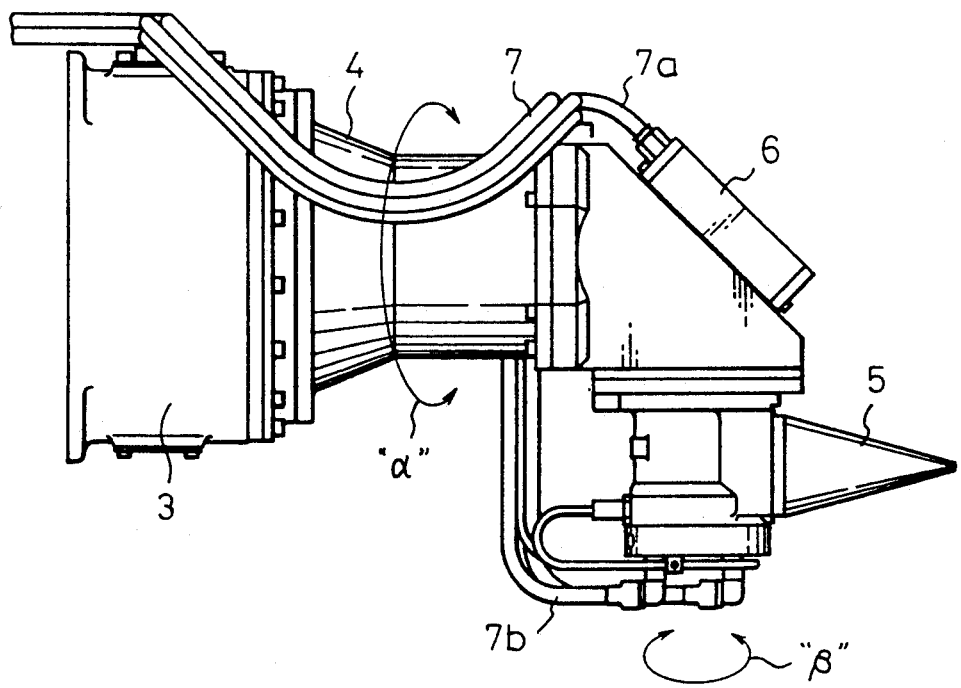

FIG. 3 illustrates a front portion of the robot arm 16 provided with a piping arrangement according to the present invention; the robot wrist 18 is capable of turning about the center axis ($\alpha$-axis) of the robot arm 16 and an axis ($\beta$-axis) perpendicular to the $\alpha$-axis, and the laser beam projecting device 20. As is obvious from the comparison of FIG. 3 with FIGS. 5A and 5B, rigid pipes, such as stainless steel pipes, 22, 24, 24', 26, 26', 28, 30 and 32 for conveying the liquid coolant and the assist gas are extended close to and along the surfaces of the robot arm 16 and the robot wrist 18. Further, indicated as 34 and 36 are the reflecting mirrors to be cooled by the liquid coolant provided on the robot wrist 18.

A novel piping arrangement, which will be described hereinbelow, formed in the joint or articulation of the robot wrist 18 enables the pipes 22 through 32 to run closely along the surface of the robot arm 16 and the robot wrist 18 without any slack therein. The novel piping arrangement formed in the joint and the articulation will be described hereinafter with reference to FIGS. 1 and 2.

Figure 1:
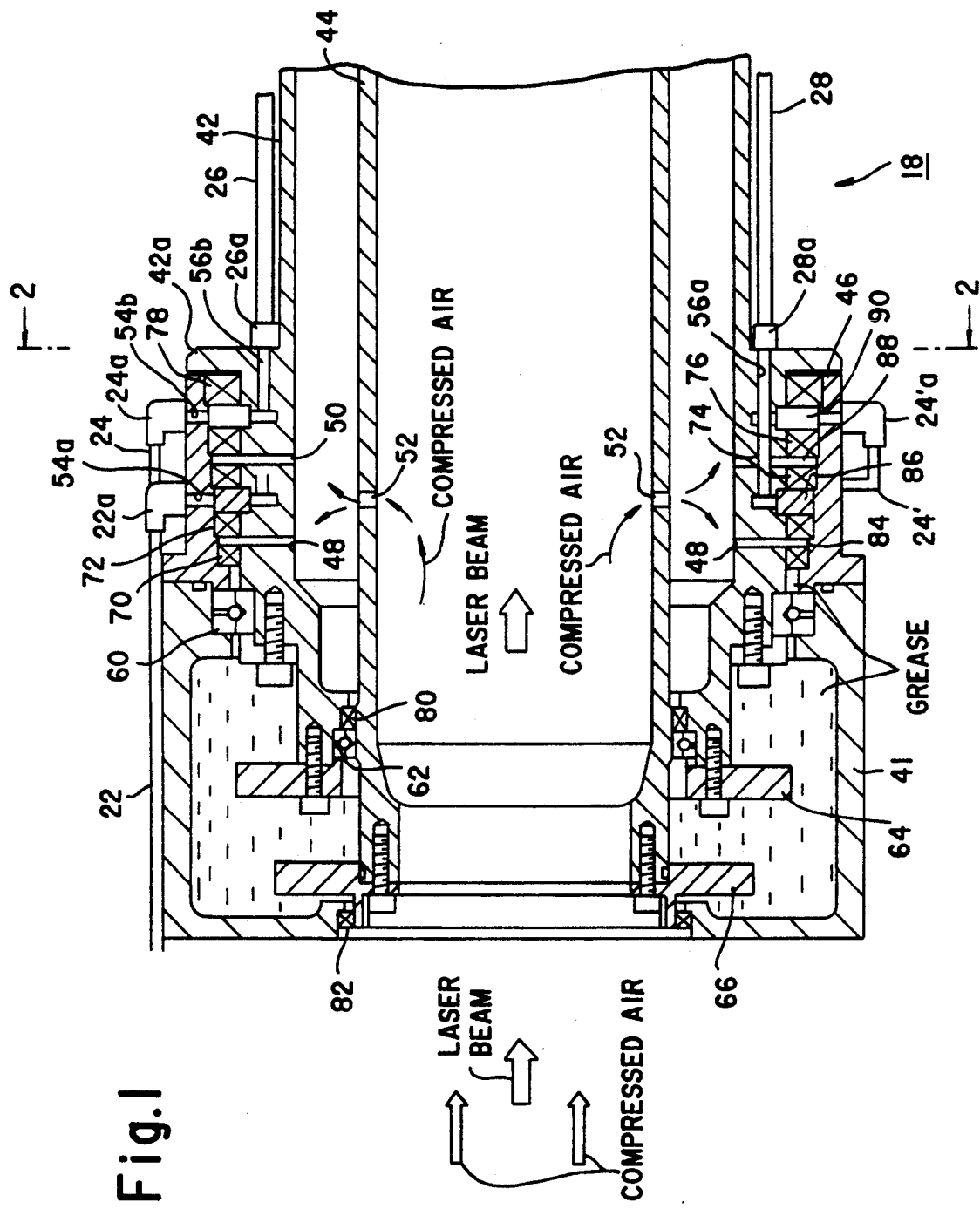
FIG. 1 is an enlarged sectional view of a piping arrangement for a robot wrist of a laser robot, in a preferred embodiment according to the present invention.
Figure 2:
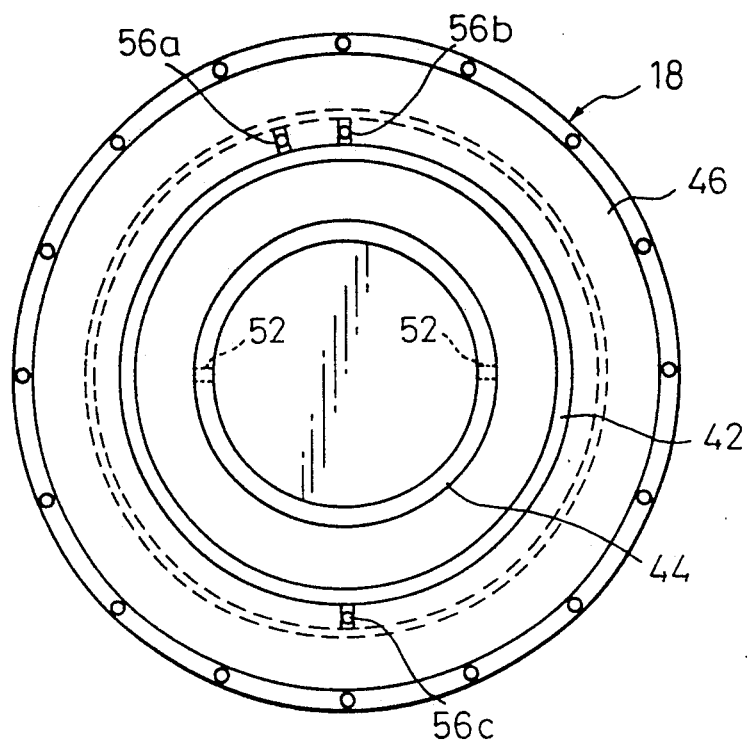
FIG. 2 is an end view taken on line 2—2 in FIG. 1.

Referring to FIGS. 1 and 2, a wrist connecting pipe 41 connected to the front end of the robot arm 16 has a caved gear chamber filled with grease. A rear end portion of the hollow sheathing pipe 42 is supported for rotation on a rotary bearing 60 in the gear chamber. The sheathing pipe 42, i.e., the outer pipe of the robot wrist 18, is journaled for rotation about the α-axis.

A hollow inner pipe 44 is extended coaxially within the sheathing pipe 42 and supported for rotation relative to the sheathing pipe 42 by a rotary bearing 62 fitted in the rear end portion of the sheathing pipe 42. An oil seal 80 is disposed contiguously with one side of the rotary bearing 62 on the inner pipe 44. A front end (not shown) of the inner pipe 44 is rotatably supported by another rotary bearing, and an oil seal is disposed contiguously with one side of the rotary bearing on the inner pipe 44, which are not shown in FIGS. 1 and 2. The inner pipe 44 is provided as a conduit for the laser beam. The interior of the inner pipe 44 is pressurized at a pressure higher than atmospheric pressure by compressed air supplied through the interior of the robot arm 16. Wrist drive gears 64 and 66 are attached to the respective rear ends of the sheathing pipe 42 and the inner pipe 44, respectively, in the gear chamber formed at the front end of the robot arm 16 with fastening means, which in this embodiment are bolts. A rotative drive force is transmitted from gears, not shown, provided on the robot arm 16 through the wrist drive gears 64 and 66 to the sheathing pipe 42 and the inner pipe 44, respectively. The wrist drive gears 64 and 66 are constantly lubricated by the grease filling the gear chamber A portion of the sheathing pipe 42 extending outside the gear chamber is provided with a flange 42a. Five oil seals, i.e., a first oil seal 70, a second oil seal 72, a third oil seal 74, a fourth oil seal 76 and a fifth oil seal 78, are arranged axially at appropriate spacings on a portion of the sheathing pipe 42 between the bearing 60 and the flange 42a, and the oil seal 80 is mounted on the inner pipe 44 contiguously with the rotary bearing 62 supporting the inner pipe 44 on the sheathing pipe 42. An oil seal 82 is fitted in a hole formed in a wall defining the rear end of the gear chamber of the robot arm 16 to prevent the leakage of grease from the gear chamber.

The first oil seal 70 disposed on the sheathing pipe 42 prevents the leakage of grease filling the gear chamber and that of the grease filling a space on the front side of the rotary bearing 60 into spaces on the side of the flange 42a. An oil seal holding ring 46 mounted on a portion of the sheathing pipe 42 between the front end of the robot arm 16 and the flange 42a applies radial pressure to the oil seals 70 through 78 to hold the same in place on the sheathing pipe 42. A first annular chamber 84, a second annular chamber 86, a third annular chamber 88 and a fourth annular chamber 90 are formed between the first oil seal 70 and the second oil seal 72, between the second oil seal 72 and the third oil seal 74, between the third oil seal 74 and the fourth oil seal 76 and between the fourth oil seal 76 and the fifth oil seal 78, respectively.

The first annular chamber 84 communicates with the pressurized interior of the inner pipe 42 by means of a plurality of radial holes 48 formed at suitable angular intervals in the sheathing pipe 42 and a plurality of radial holes 52 formed at suitable angular intervals in the inner pipe 44, and the third annular chamber 88 communicates with the pressurized interior of the inner pipe 44 by means of a plurality of radial holes 50 formed in the sheathing pipe 42 at suitable angular intervals and the plurality of radial holes 52 formed in the inner pipe 44. Accordingly, the first annular chamber 84 and the third angular chamber 88 are pressurized by the compressed air prevailing within the interior of the inner pipe 44 so as to exert pressure to the oil seals 70 and 72 defining the first annular chamber 84, and the oil seals 74 and 76 defining the third annular chamber 88.

The second annular chamber 86 is connected through a radial hole 54a formed in the oil seal holding ring 46 to a pipe fitting 22a fixed to the oil seal holding ring 46, and the fourth annular chamber 90 is connected through radial holes 54b to pipe fittings 24a and 24'a fixed to the oil seal holding ring 46, respectively. The rigid pipes 22 and 24 are connected to the pipe fittings 22a, 24a and 24'a (FIG. 3). Furthermore, the second annular chamber 86 and the fourth annular chamber 90 are connected through longitudinal passages 56a, 56b and 56c formed in the flange 42a of the sheathing pipe 42, and pipe fittings 26a, 26'a and 28a to the rigid pipes 26, 26' and 28 (FIG. 3) fixed to the flange 42a. In this embodiment, the assist gas supplied through the rigid pipe 22 into the second annular chamber 86 fills the second annular chamber 86 and flows through the passage 56a and the rigid pipe 28 to the front end of the robot wrist 18. Then, the assist gas flows from the robot wrist 18 through the rigid pipe 32 (FIG. 3) into the laser beam projecting device 20. Thus, the second annular chamber 86 is a transfer chamber formed within the robot wrist 18 to transfer the assist gas from the rigid pipe 22 to the rigid pipe 28 without twisting or pulling the rigid pipes when the robot wrist 18 is turned relative to the robot arm 16.

Similarly, the liquid coolant, i.e., the liquid cooling medium, supplied through the rigid pipe 24 and flows through the passage 56b, the pipe fitting 26a and the rigid pipe 26 to the reflecting mirror 34 of the robot wrist 18 to cool the reflecting mirror 34. Then, the liquid coolant flows through the rigid pipe 30 (FIG. 3) to the reflecting mirror 36 to cool the same. Then, the liquid coolant returns through the rigid pipe 26' into the fourth annular chamber 90, and then flows through the rigid pipe 24', i.e., a return pipe, and the interior of the robot unit 10 to the liquid coolant source. Thus, the fourth annular chamber 90 is a liquid coolant transfer chamber formed within the robot wrist 18. Although the supply liquid coolant and the return liquid coolant mix with each other in the fourth annular chamber 90, no problem arises with regard to the cooling effect of the liquid coolant as long as the liquid coolant is circulated.

As is apparent from the foregoing description, according to the present invention, the annular chambers 84 through 90 formed in an axially inward portion of the sheathing pipe 42 and the inner pipe 44 of the robot wrist 18 by using the oil seal means enable the use of the rigid pipes 22 and 24, i.e., rigid metal pipes, extended to run close to and along the outer surface of the robot arm 16 and the like rigid pipes 26 and 28 extended to run close to and along the outer surface of the robot wrist 18 for supplying and returning gas and liquid, the pipes of the piping system can be extended close to and along the outer surface of the robot wrist whereas the flexible pipes of the conventional piping system are extended slackly around the robot wrist, and the plurality of annular chambers 84 to 90 are arranged sequentially along the axis of the sheathing pipe 42. Accordingly, the piping arrangement of the present invention can be compact without requiring an increase in the diameter of the sheathing pipe 42, and rigid metal pipes, such as stainless steel pipes, will not be damaged by debris or spatters expelled from the workpiece during laser machining.

Since the first annular chamber 84 and the third annular chamber 88 are pressurized at a pressure higher than atmospheric pressure by the compressed air supplied into the interior of the inner pipe 44 so as to exclude dust, the pressure acting on the first oil seal 70, the second oil seal 72, the third oil seal 74 and the fourth oil seal 76 are equilibrated and thereby the sealing performance of the first to fourth oil seals is enhanced. The fifth oil seal 78 disposed in contact with the flange 42a of the sheathing pipe 42 is protected from damages that may be caused by spattering debris.

Since the sealing ability of the sealing means is enhanced, the sealing means effectively prevents leakage of the gas and the liquid from the second annular chamber 86 and the fourth annular chamber 90, which serve as transfer chambers for transferring the assist gas and the liquid coolant, and the possibility of leakage of liquid into the interior of the robot wrist 18 can be assuredly eliminated. Since the piping arrangement uses a part of the compressed air inherently used in the laser robot system, the piping arrangement does not need an additional compressed air source. Thus, the present invention increases the rate of operation of the existing equipment.

A fifth annular chamber may be additionally formed in the flange 42a of the sheathing pipe 42 at a position next to the fourth annular chamber 90 in such a manner that the fifth chamber is filled with the compressed air equally with the fourth chamber 90. Then the compressed air, the performance of the robot wrist 18 in preventing leakage of the liquid toward the external region of the robot wrist 18 can be enhanced Referring to FIG. 2 showing a section of the robot wrist 18 taken on line 2—2 in FIG. 1, the flange 42a of the sheathing pipe 42 is provided with the passages 56a and 56b, and a return passage 56c, which is not shown in FIG. 3, for the liquid coolant. It is noted that, although the passage 56a for the assist gas and the passage 56b for the liquid coolant are shown respectively at diametrically opposite positions in FIG. 1, actually, the passages 56a and 56b are positioned close to each other, and the passages 56b and 56c are positioned substantially diametrically opposite each other as shown in FIG. 2.

Figure 6A:
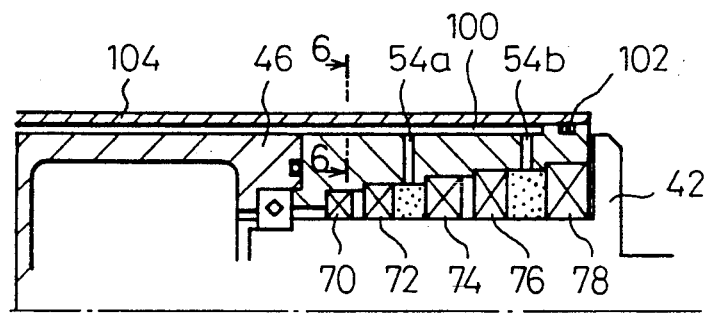
FIG. 6A is a fragmentary sectional view of a modification of the piping arrangement of the present invention.
Figure 6B:
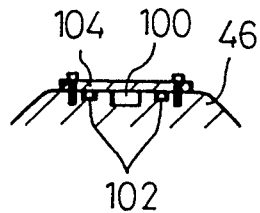
FIG. 6B is a sectional view taken on line 6—6 in FIG. 6A.

Although the present invention has been described in a typical embodiment thereof with reference to the accompanying drawings, it is needless to say that a piping arrangement, similar to the foregoing piping arrangement, having a plurality of annular chambers formed between oil seal means is incorporated into a joint joining the rear portion and the front portion of the robot wrist 18 so as to transfer the assist gas from the rigid pipe 28 to the rigid pipe 32 and transfer the liquid coolant from the rear portion of the robot wrist 18 to the rigid pipe 30 attached to the front portion of the robot wrist 18. In a modification, axial grooves 100 are formed in the outer circumference of the oil seal holding ring 42, and the oil seal holding ring 42 is covered with a cover 104 and the axial grooves 100 are sealed by sealing members 102 as shown in FIGS. 6A and 6B to use the axial grooves 100 as passages for the assist gas and the liquid coolant.

From the foregoing description, it will be understood that the present invention provides annular chambers on the sheathing pipe of the robot wrist of a laser robot by using a sealing means including a plurality of oil seals, uses some of the annular chambers as a gas-carrying annular chamber for transferring an assist gas from one line to another so as to supply the assist gas therethrough and as a liquid-conveying annular chamber for transferring a liquid coolant from one line to another so as to supply and return the liquid coolant, forms passages by fixedly arranging rigid metal pipes, such as stainless steel pipes, close to and along the outer surfaces of the robot forearm and the robot wrist or by forming axial grooves in the outer circumference of the oil seal holding ring mounted on the sheathing pipe of the robot wrist, covering the axial grooves with a cover and sealing the axial grooves by sealing members, and applies the pressure of compressed air supplied for dust exclusion into the interior of the inner pipe of the robot wrist to the predetermined annular chambers to use the predetermined annular chambers as pressure chambers so as to apply the pressure to the sealing means demarcating the pressure chambers and prevent leakage of the assist gas and the liquid coolant respectively from the gas-carrying annular chamber and the liquid-carrying annular chamber. Accordingly, the piping arrangement of the present invention is compact compared with the conventional piping arrangement including flexible pipes slackly extended around the robot wrist, and is capable of preventing damage to the pipes and leakage of the assist gas and the liquid coolant into the interior of the robot wrist.

We claim:

1. A piping arrangement for a laser robot wrist for supplying working media such as an assist gas and a liquid coolant, through a plurality of supply pipe means to the robot wrist joined for rotation at least about one axis to an extremity of a robot forearm of the laser robot, and holding a laser beam projecting device at a front end thereof, said piping arrangement comprising:
a sheathing pipe means provided as an outer pipe of said robot wrist;
a plurality of sealing means disposed on said sheathing pipe means of said robot wrist at appropriate spacings along a direction of an axis of rotary bearings supporting said robot wrist for rotation and provided in a joint joining said sheathing pipe means to an extremity of a robot forearm;
a sealing means holding ring mounted on said plurality of sealing means to hold said sealing means in place;
a plurality of annular chambers formed between respective two neighbouring sealing means of said plurality of sealing means, and including at least one gas-carrying annular chamber and at least one liquid-carrying annular chamber;
first working medium supply pipe means connected to said gas-carrying annular chamber and said liquid-carrying annular chamber among said plurality of annular chambers and fixedly arranged along an outer surface of said robot forearm to convey a gaseous working medium and a liquid working medium; and
second working medium supply pipe means arranged close to and along an outer surface of said sheathing pipe means of said robot wrist to convey the assist gas and the liquid coolant through said gas-carrying annular chamber and said liquid-carrying annular chamber to a front portion of said robot wrist and to said laser beam projecting device.

2. A piping arrangement for a laser robot wrist, according to claim 1, wherein said liquid-carrying annular chamber communicates with said second working medium supply pipe means by means of a liquid coolant supply port and with a return pipe means through which the liquid coolant is returned thereto by means of a liquid coolant return port.

3. A piping arrangement for a laser robot wrist, according to claim 1, wherein predetermined annular chambers among said plurality of annular chambers are arranged on opposite sides of at least said gas-carrying annular chamber to be used as annular pressure chambers, and an inner pipe extended within the sheathing pipe means of said robot wrist is provided with air passage means through which pressure of compressed air supplied into said inner pipe is applied to said annular pressure chambers.

4. A piping arrangement for a laser robot wrist, according to claim 3, wherein a predetermined annular chamber among said plurality of annular chambers is formed as an annular pressure chamber at least on one side of said liquid-carrying annular chamber.

5. A piping arrangement for a laser robot wrist, according to claim 3, wherein said plurality of sealing means are five annular oil seals, said plurality of annular chambers are first, second, third and fourth annular chambers formed between the respective two neighbouring annular oil seals, said second annular chamber being used as said gas-carrying annular chamber, and said fourth annular chamber being used as said liquid-carrying annular chamber.

6. A piping arrangement for a laser robot wrist, according to claim 5, wherein said first and third annular chambers are used as said annular pressure chambers.

7. A piping arrangement for a laser robot wrist for supplying working media such as an assist gas and a liquid coolant through a plurality of supply pipe means to the robot wrist joined for rotation at least about one axis to an extremity of a robot forearm of the laser robot and holding a laser beam projecting device at a front end thereof; said piping arrangement comprising:

a sheathing pipe means provided as an outer pipe of said robot wrist;

a plurality of sealing means disposed on said sheathing pipe means of said robot wrist at appropriate spacings along a direction of an axis of rotary bearings supporting said robot wrist for rotation and provided in a joint joining said sheathing pipe means to said extremity of said robot forearm;

a sealing means holding ring mounted on said plurality of sealing means for holding said sealing means in place;

a plurality of annular chambers, each being formed between the two adjacent sealing means among said plurality of sealing means, and including at least one gas-carrying annular chamber and at least one liquid-carrying annular chamber;

first working medium supply pipe means fluidly communicated with said gas-carrying annular chamber and said liquid-carrying annular chamber among said plurality of annular chambers and fixedly arranged close to and along an outer surface of said robot forearm to convey the assist gas and the liquid coolant;

second working medium supply pipe means arranged close to and along an outer surface of said sheathing pipe means of said robot wrist to convey the assist gas and the liquid coolant through said gas-carrying annular chamber and said liquid-carrying annular chamber to a front portion of said robot wrist and to said laser beam projecting device, respectively; and compressed air passage means formed in an inner pipe extended within said sheathing pipe means of said robot wrist to apply pressure of compressed air through said inner pipe to predetermined annular chambers among said plurality of annular chambers formed on opposite sides of said gas-carrying annular chamber and on opposite sides of said liquid-carrying annular chamber to prevent leakage of the assist gas and the liquid coolant respectively from said gas-carrying annular chamber and said liquid-carrying annular chamber.

8. A piping arrangement for a laser robot wrist, according to claim 7, wherein said sealing means among said plurality of sealing means, disposed at a rear end of said sheathing pipe means is provided as an oil seal for sealing grease lubricant for lubricating a wrist drive mechanism formed at an end of said robot forearm.

* * * * *